United States Patent Office 2,869,923
Patented Jan. 20, 1959

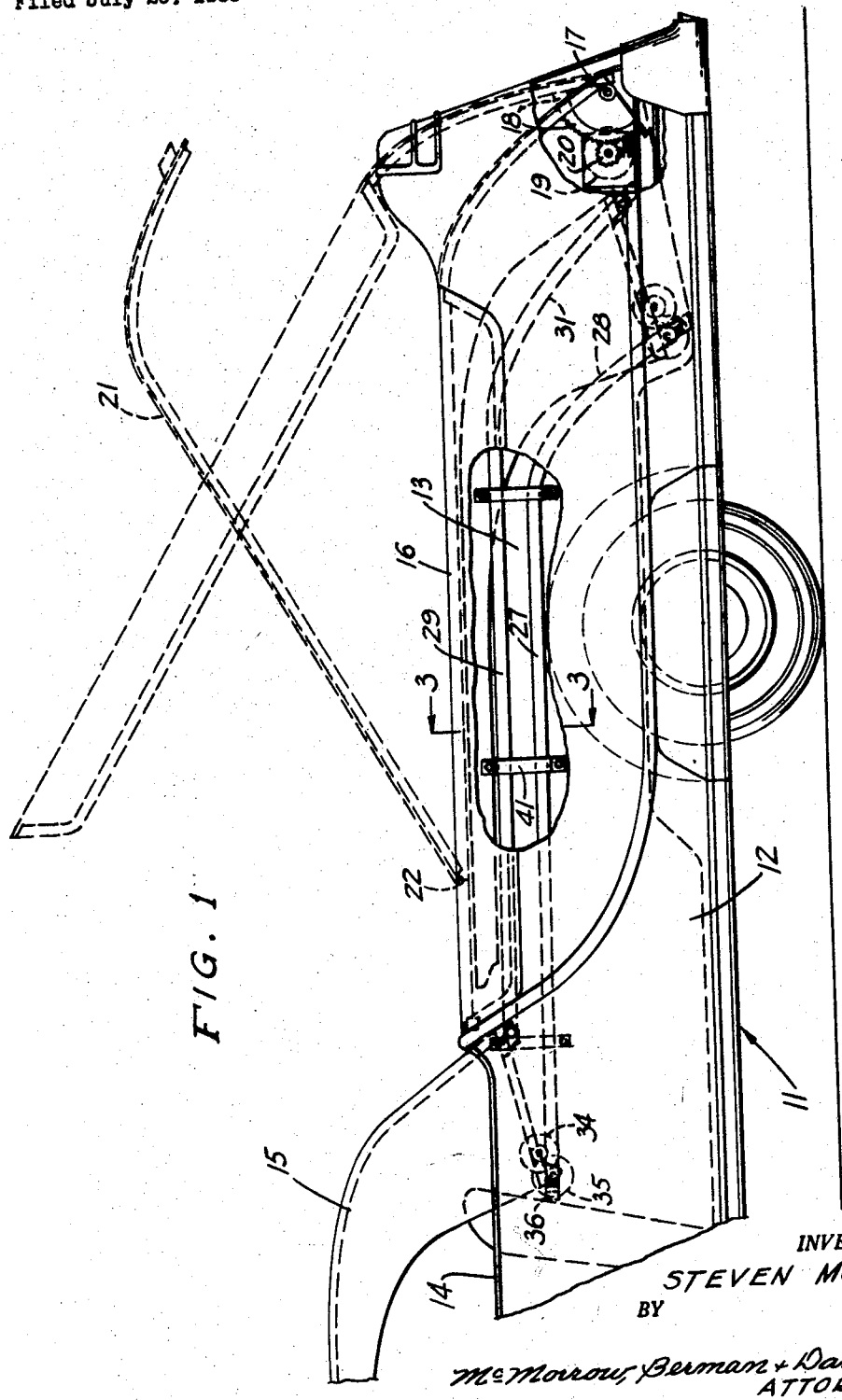

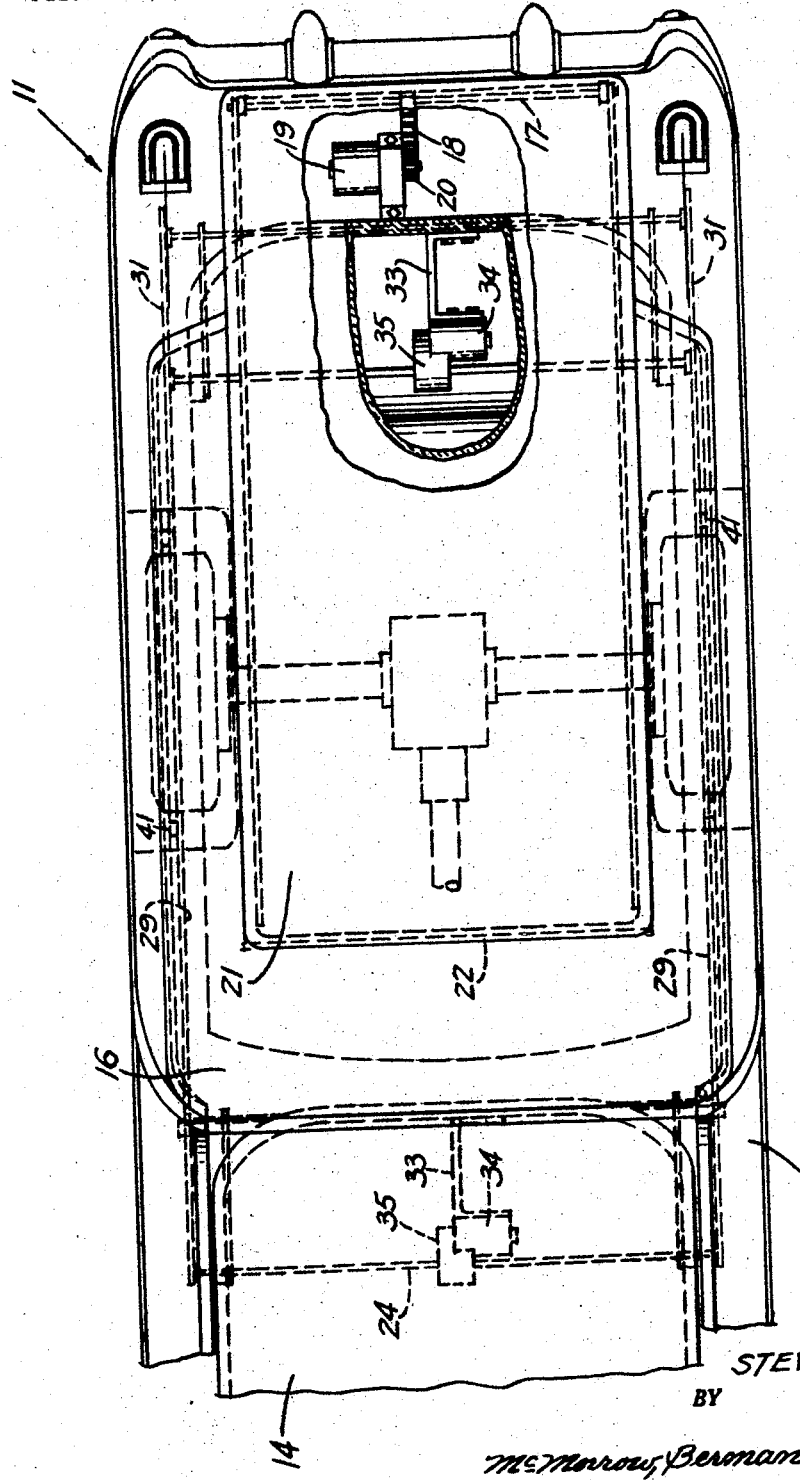

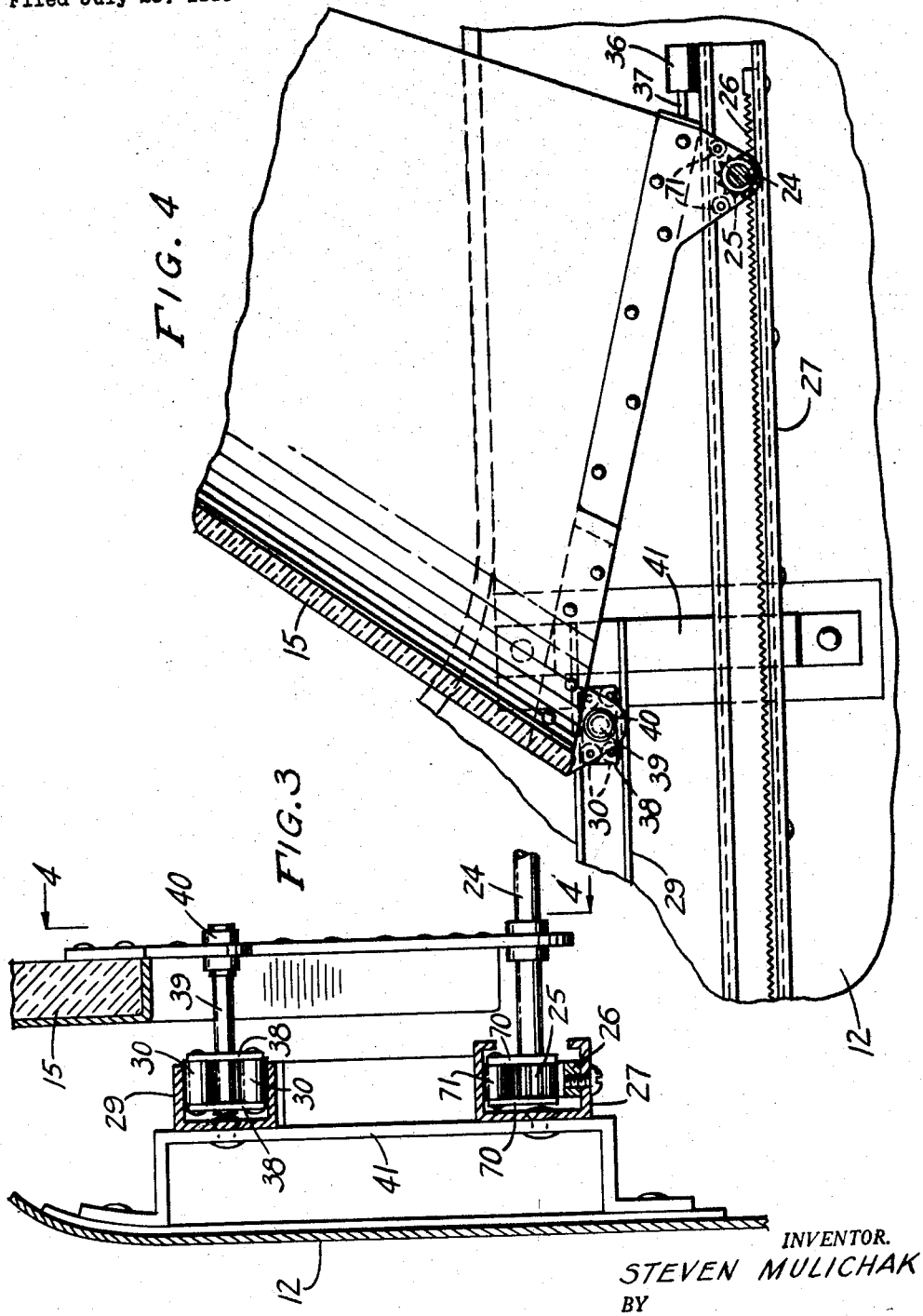

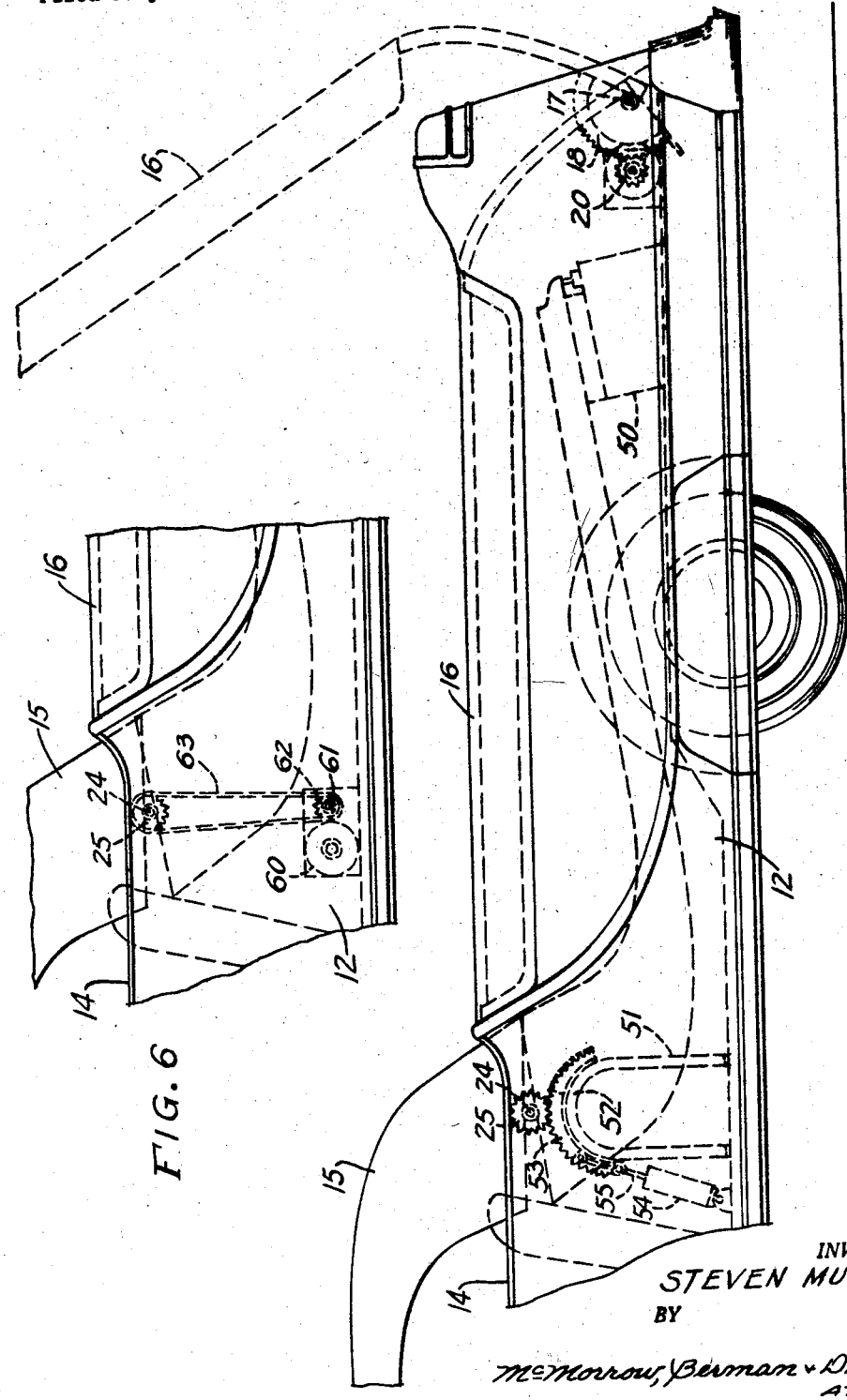

2,869,923

RETRACTABLE HARD TOP CONVERTIBLE

Steven Mulichak, Youngstown, Ohio

Application July 29, 1955, Serial No. 525,141

2 Claims. (Cl. 296—117)

This invention relates to convertible vehicle bodies, and more particularly to a convertible vehicle having a rigid top.

A main object of the invention is to provide a novel and improved convertible vehicle body of the type having a rigid top which may be retracted to a stored position in the vehicle body at times, and which may at other times be extended to an operative position overlying the passengers' compartment of the vehicle, the vehicle body being simple in construction, being attractive in appearance, and having an operating mechanism involving relatively simple and few parts.

A further object of the invention is to provide an improved convertible motor vehicle body which is relatively inexpensive to fabricate, which provides a reliable means for mechanically retracting the vehicle top and storing same in the rear portion of the vehicle body, and for extending the top to its operative position overlying the passengers' compartment of the vehicle, when required, the improved vehicle body including a trunk compartment which may ordinarily be employed for the transportation of various objects, but which is available for use to store the rigid top of the vehicle, when said top is retracted.

Further objects and advantages of the invention will become apparent from the following description and claims, and from the accompanying drawings, wherein:

Figure 1 is a fragmentary side elevational view of the rear portion of a motor vehicle body constructed in accordance with the present invention.

Figure 2 is a top view of the motor vehicle body structure shown in Figure 1.

Figure 3 is an enlarged transverse vertical cross sectional view taken on the line 3—3 of Figure 1.

Figure 4 is an enlarged fragmentary cross sectional view taken on the line 4—4 of Figure 3.

Figure 5 is a fragmentary side elevational view, similar to Figure 1, but illustrating a modified form of hard top convertible motor vehicle body according to the present invention.

Figure 6 is a fragmentary side elevational view of a portion of a further modified form of hard top convertible motor vehicle body according to this invention.

Referring to the drawings, and more particularly to Figures 1 to 4, 11 generally designates a hard top convertible motor vehicle body according to the present invention, said body comprising a main portion 12 provided with a rear compartment 13 located rearwardly of the driver's compartment 14. The body 11 is provided with the rigid top 15 which normally extends over the passengers' compartment 14 and which is detachably secured in its position, as by being latched, in a suitable manner to the windshield frame of the motor vehicle, the top 15 being at times movable into the rear compartment 13 in a manner presently to be described.

It will be understood that the forward portion of the rigid top 15 may be releasably fastened to the frame of the main body 12, such as to the windshield frame in any suitable manner employing conventional means, not shown, said fastening means forming no part of the present invention.

Designated at 16 is a rear deck or cover for the compartment 13, the deck 16 being hinged to the rear end of the main body portion 12 on a transverse horizontal axis 17. Secured to the rear portion of the deck 16 concentrically with the axis 17 is an arcuate rack gear 18. Mounted on the main body portion 12 adjacent the rack gear 18 is an electric motor 19 having mounted on its shaft a pinion gear 20 which meshes with the rack gear 18, as shown in Figures 1 and 2, and which is of the conventional reversible type whereby it may be energized to rotate the pinion gear 20 either in a clockwise direction, as viewed in Figure 1, or in a counterclockwise direction, to either elevate or lower the deck 16.

The motor 19 is provided with a suitable energizing circuit, not shown, including limit switches controlling the energizing circuit in a conventional manner to cause said energizing circuit to be automatically opened when the deck reaches its fully elevated position, as shown in dotted view in Figure 1, and being similarly provided with a limit switch to cause the energizing circuit to be opened when the deck 16 reaches its closed position, shown in full line view in Figure 1.

The respective energizing circuits for the motor 19 are of a conventional nature and are believed to be well known to those skilled in the art. Thus, the motor 19 may have a first energizing circuit, controlled by a suitable manual switch, for energizing the motor in a direction to elevate the deck 16 to the dotted view position of Figure 1, the limit switch in the first energizing circuit opening the circuit when the deck reaches its fully elevated position. A second energizing circuit may be provided for the reversing winding of the motor 19, said second energizing circuit being provided with a manually controlled switch and being provided with a limit switch which opens to deenergize the motor 19 when the deck 16 has reached its closed position, shown in full line view in Figure 1.

Alternatively, other well known means may be provided for raising and lowering the deck 16, including manually operated means, hydraulically operated means, or the like.

The deck 16 is provided with a closure door 21 hinged to the forward portion of the deck, for example, at 22, for rotation to an upwardly and rearwardly inclined open position, shown in dotted view in Figure 1, providing access to the rear compartment 13 when the deck 16 is in its lowered position.

Suitable conventional releasable latch means may be provided to releasably lock the deck 16 in its lowered position, if so desired, and conventional latch means may be provided for the hinged closure door 21 to lock said door in its closed position.

Journaled transversely to the lower forward corner portions of the side walls of the rigid top 15 is a shaft 24 on the ends of which are mounted respective pinion gears 25, said pinion gears meshingly engaging with respective rack bars 26 secured longitudinally in respective guide channels 27 secured to the inside surfaces of the side walls of the main body portion 12 and extending rearwardly into the rear compartment 13, as shown in Figure 1. The shafts 24 extend rotatably through spaced triangular guide plates 70, 70 located in the guide channels 27, as shown in Figure 3, the pinion gears 25 being secured on the shafts 24 between said guide plates 70, 70. Journalled between the top corners of each pair of guide plates 70, 70 are a pair of spaced rollers 71, 71 engaging the top flange of the associated guide channel 27, to prevent the associated pinion gear 25 from contacting said top flange. The channels 27 are arcuately curved downwardly, as shown at 28, near the rear end of the compartment 13. Secured to the inside surfaces of the side walls of the rear portion of the vehicle body are additional longitudinally extending channels 29 which receive guide roller elements 30 journaled to the respective rear corner portions of the side walls of the rigid top 15, the rollers 30 being suitably mounted in the manner illustrated in Figure 3 to define a support means for the top 15 to support said top against rotation while allowing the top to slide on the channels 29 responsive to longitudinal movement of the top relative to the channels 27 resulting from rotation of the shaft 24. The channels 29 are arcuately curved downwardly toward the rear end of the compartment 13, as shown at 31 in Figure 1, following the curvature of the arcuately curved portions 28 of the guide channels 27 in accordance with the spacing between the shaft 24 and the guide rollers 30, whereby the top 15 will be supported against rotation during the full extent of its rearward movement from the normal position thereof shown in Figure 1 to the retracted position thereof shown in dotted view in said figure, wherein the top 15 is housed in the rear compartment 13.

Secured to the rigid top 15 is a bracket 33 on which is mounted a reversible electric motor 34 provided with reduction gearing 35 and being drivingly coupled to the shaft 24 through said reduction gearing, the motor 34 being provided with suitable energizing circuits for energizing same to rotate the shaft 24 in either of two directions, each of said energizing circuits being provided with suitable manually controlled switch means and with limit switches to deenergize the circuits at the ends of the respective desired paths of travel of the top 15.

As in the case of the motor 19, the respective reverse energizing circuits of the motor 34 are conventional and are believed readily understandable to anyone skilled in the art. One of said energizing circuits, namely the circuit for energizing motor 34 to move the rigid top 15 from the normal position thereof shown in Figure 1, to the stored position thereof shown in dotted view in Figure 1, includes a limit switch to open the energizing circuit when the rigid top 15 has moved into its fully retracted position in the rear storage compartment 13. The other energizing circuit for the motor 34 includes a limit switch, such as the limit switch shown at 36 in Figure 4, arranged to open the circuit when the top 15 has been moved from its retracted position to its normal position overlying the passenger compartment 14. As is shown in Figure 4, the limit switches may be mounted in any suitable position so that the operating elements 37 thereof may be engaged by a portion of the top 15 when the limiting position of the top has been reached.

As shown in Figures 3 and 4, the rollers 30 may be suitably mounted between brackets 38 carried on laterally extending shafts 39 rotatably supported in bearing members 40 secured to the side walls of top 15.

The channel members 27 and 29 may be supported on suitable vertically positioned offset bracket bars 41 secured to the inside surfaces of the side walls of the main body portion 12 of the motor vehicle.

It will be readily apparent that when it is desired to retract the top 15, the motor 19 is first energized to elevate the deck 16 to the dotted view position thereof shown in Figure 1, after which the motor 34 is energized to retract the top 15 from the full line position thereof in Figure 1 to the dotted view position thereof, whereby the top 15 is moved rearwardly and lowered into the compartment 13. The motors 19 and 34 become automatically deenergized when the limiting positions of the elements driven thereby are reached. After the top 15 has been retracted into the compartment 13, the reverse energizing circuit of the motor 19 is closed to cause the deck 16 to be lowered to its closed position, the motor 19 becoming automatically deenergized when deck 16 reaches said closed position, by the action of the limit switch in the motor circuit.

To restore the top 15 to its normal position, shown in Figure 1, the deck 16 is first opened, in the same manner as previously described, to the dotted view position thereof shown in Figure 1, after which the reverse energizing circuit for the motor 34 is closed, causing the top 15 to be moved forwardly and elevated to bring the top 15 to its forward position, the motor 34 then becoming deenergized by the action of the limit switch in the circuit thereof, namely, the limit switch 36, shown in Figure 4, after which the deck 16 may be lowered and the top 15 may be latched in its forward position overlying the passenger compartment 14.

Figure 2 illustrates a portion of the top 15 in cross section, the top 15 being shown in retracted position in the rear storage compartment 13. Thus, Figure 2 shows the driving shaft 24 in full line view at the rear portion of the motor vehicle body, and also shows the driving shaft 24 in dotted view at the forward portion of the vehicle body, illustrating the normal position of the driving shaft 24 when the top 15 is in its position overlying the driver's compartment 14.

Referring now to the modification of the invention shown in Figure 5, the top 15 may be mounted for rotation around the transverse horizontal axis defined by the transverse driving shaft 24, as by the provision of suitable bearing brackets secured to the vehicle body and rotatably supporting shaft 24, whereby the top 15 is rotatable from its full line view, shown in Figure 5, to the dotted view position thereof illustrated in said figure, a suitable rest or support 50 being provided in the rear portion of the rear compartment 13 to support the forward end portion of top 15 in the rotated position of the top.

Secured to the respective side portions of the main body 12 of the vehicle in Figure 5 are upstanding support brackets 51 provided with the semicircular top end portions 52 on which are slidably mounted, in any suitable manner, respective arcuate rack gears 53. Thus, the arcuate rack gears 53 may be slidably interlocked with the semicircular bracket top portions 52, as by the provision of suitable T-shaped channels or grooves in the semicircular bracket portions 52 and by the provision of suitable T-shaped ribs on the arcuate rack bars 53 slidably interfitting said channels so that the rack bars 53 are keyed to the semicircular members 52 for sliding movement thereon. The rack bars 53 are meshingly engaged with the respective pinion gears 25. The shaft 24 is rigidly secured to the intermediate portions of the bottom edges of the side walls of the rigid top 15, whereby the top 15 will be rotated responsive to the rotation of the pinion gears 25. Such rotation is produced by the movement of the arcuate rack bars 53 along the semicircular rack bar supporting elements 52.

Pivoted to the body portion 12 adjacent the forward end portions of the rack bars 53 are respective hydraulic cylinders 54 having extensible piston rods 55 which are rotatably connected to the forward ends of the respective rack bars 53, whereby the rack bars 53 are moved clockwise, as viewed in Figure 5, on their supports 52, responsive to extension of the piston rods 55, and conversely are moved counterclockwise when the pistons 55 are retracted in the cylinders 54. The rack bars 53 normally are in their rearwardly moved positions, shown in full line view in Figure 5, whereby the top 15 is in its normal position overlying the driver's compartment 14 of the vehicle. When the piston elements 55 are retracted in their cylinders 54, the rack bars 53 are moved counterclockwise, as viewed in Figure 5, causing the pinion gears 25 to be rotated clockwise, whereby the top 15 is rotated clockwise from its full line position of Figure 5 to its dotted line position thereof.

A suitable electrically driven gear pump is provided on the vehicle, the gear pump being connected between a suitable reservoir and the cylinder 54, suitable control valves being provided so that fluid under pressure from the pump may be at times transmitted to the cylinders 54, suitable hydraulic circuits being provided so that the pistons of the cylinders may be moved either upwardly or downwardly in the cylinders, under control of suitable valves, all being conventional in structure.

When it is desired to retract the top 15, the deck 16 is first elevated to its fully open position, shown in dotted view in Figure 5, in the same manner as described in connection with the form of the invention illustrated in Figures 1 to 4. The top 15 is then rotated, by means of the hydraulic cylinders 54 to the dotted view position thereof shown in Figure 5, after which the top 16 is lowered to its full line, closed position of Figure 5. To restore the top 15 to its normal position overlying the driver's compartment 14, the deck 16 is first elevated to its fully open position, shown in dotted view in Figure 5, after which fluid under pressure is admitted to the cylinders 54 to raise the pistons in the cylinders 54 and to move the rack bars 53 clockwise, as viewed in Figure 5, whereby the pinion gears 25 are rotated counterclockwise and whereby the top 15 is rotated counterclockwise from the dotted view position of Figure 5 to the full line position therein.

It will be understood that suitable control valves and suitable hydraulic circuits are provided between the fluid pump and the cylinders 54, said circuits being conventionally arranged so that the valves may be operated selectively to cause the pistons in the cylinders to be moved upwardly or downwardly, as desired by the operator. Such hydraulic circuits in themselves are well known in the art and form no part of the present invention. Obviously, any other well known means may be employed to move the arcuate rack bars 53 forwardly and rearwardly on their semicircular supports 52.

Referring now to the further modified form of the present invention shown in Figure 6, the top 15 is mounted on the shaft 24 of the pinion gears 25, said shafts being supported in the same manner as in the form of the invention of Figure 5 so that the top 15 may be rotated from the full line position of Figure 6 to a position wherein the top will be received in the rear compartment 13, as in Figure 5, Figure 6 showing the dotted view position of the top 15 in its stored position. Mounted on the main body portion 12 of the vehicle below the shaft 24 is an electric motor 60 which is drivingly coupled through suitable gear reduction means to a transverse shaft 61 on which is mounted a drive pinion gear 62. Gear 62 is coupled to shaft 24, as by a sprocket chain 63 engaged around gear 62 and one of the gears 25. It will be readily understood that the gears 62 and 25 may be provided with suitable sprocket teeth shaped to intermesh with the sprocket chain 63 so that a driving connection is provided between the gear 62 and the shaft 24. The motor 60 may be of a conventional reversible type and may be provided with suitable energizing circuits for operating the motor in reverse directions, said circuits being preferably provided with limit switches, as in the form of the invention illustrated in Figures 1 to 4, whereby the motor 60 may be energized to rotate the top 15 from its normal position overlying the operator's compartment 14 to its housed position, and vice versa, by closing the respective energizing circuits of the motor 60, as by means of suitable manually operated switches provided in said circuits.

While certain specific embodiments of an improved convertible vehicle body have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle body, a rear compartment, a rear deck hinged at its rear end to the rear end of the body on a transverse hinged axis and being arranged to overlie said compartment, said rear deck rotating upwardly to a forwardly and upwardly extending position, a closure door hingedly mounted in said rear deck on a transverse hinge axis located adjacent the forward end of said rear deck, said closure door being movable to an upwardly and rearwardly extending position to allow access to said rear compartment when said rear deck is in lowered closed position, an arcuate rack rigidly secured to said rear deck concentrically with said second-named hinge axis, driving pinion means mounted on said body meshing with said arcuate rack, and means to drive said pinion means to at times elevate said rear deck to an upwardly and forwardly extending open position, a rigid top, guide track means on the body slidably supporting said top for longitudinal movement into and out of said rear compartment, longitudinal rack means on said body vertically spaced from and substantially coextensive in length with said guide track means, pinion means carried by said top and meshing with said longitudinal rack means, and drive means on said top drivingly coupled to said pinion means and being arranged to move said top longitudinally on said guide track means, whereby said top may be at times moved into said rear compartment and may be covered by said rear deck.

2. In a vehicle body, a rear compartment, a rear deck hinged at its rear end to the rear end of the body on a transverse hinge axis and being arranged to overlie said compartment, said rear deck being rotated upwardly to a forwardly and upwardly extending position, a closure door hingedly mounted in said rear deck on the transverse hinge axis located adjacent the forward end of said rear deck, said closure door being movable to an upwardly and rearwardly extending position to allow access to said rear compartment when said rear deck is in lowered closed position, an arcuate rack rigidly secured to said rear deck concentrically with said second-named hinge axis, driving pinion means mounted on said body meshing with said arcuate rack, and means to drive said pinion means to at times elevate said rear deck to an upwardly and forwardly extending open position, a rigid top, guide track means on the body slidably supporting said top for longitudinal movement into and out of said rear compartment, longitudinal rack means on said body spaced below and being substantially coextensive in length with said guide track means, pinion means carried by said top and meshing with said longitudinal rack means, and drive means on said top drivingly coupled to said pinion means and being formed and arranged to move said top longitudinally on said supporting means, whereby said top may be at times moved into said rear compartment and may be covered by said rear deck.

References Cited in the file of this patent

UNITED STATES PATENTS

| | | |
|---|---|---|
| 1,416,659 | Watt et al. | May 16, 1922 |
| 2,007,873 | Paulin | July 9, 1935 |
| 2,105,293 | Paulin | Jan. 11, 1938 |
| 2,215,363 | Rupple et al. | Sept. 17, 1940 |
| 2,471,378 | Shilala | May 24, 1949 |
| 2,768,025 | Spear | Oct. 23, 1956 |

FOREIGN PATENTS

| | | |
|---|---|---|
| 1,086,921 | France | Feb. 17, 1955 |
| 317,052 | Italy | Apr. 23, 1934 |